United States Patent [19]

Bujese

[11] 4,183,660

[45] Jan. 15, 1980

[54] TIMING APPARATUS IN A COPIER

[75] Inventor: David P. Bujese, Toms River, N.J.

[73] Assignee: Pitney-Bowes, Inc., Stamford, Conn.

[21] Appl. No.: 968,450

[22] Filed: Dec. 11, 1978

[51] Int. Cl.² ............................................ G03G 15/30
[52] U.S. Cl. ........................................ 355/51; 355/8; 355/14 R
[58] Field of Search .................. 355/14, 51, 50, 8, 11, 355/66

[56] References Cited

U.S. PATENT DOCUMENTS

| | | | |
|---|---|---|---|
| 3,948,510 | 4/1976 | Iwamoto et al. | 355/14 X |
| 3,948,586 | 4/1976 | Komari et al. | 355/14 |
| 3,950,090 | 4/1976 | Washio et al. | 355/51 X |
| 4,033,689 | 7/1977 | Washio et al. | 355/51 X |

Primary Examiner—L. T. Hix
Assistant Examiner—W. J. Brady

Attorney, Agent, or Firm—Lawrence E. Sklar; William D. Soltow, Jr.; Albert W. Scribner

[57] ABSTRACT

A copier including a document transporting carriage movable from a home position through a document illuminating station and back to the home position, and including instrumentalities for energizing the copier for a predetermined time interval to copy a document on the carriage is provided with timing apparatus for disabling the energizing instrumentalities. The timing apparatus includes a switch operatively connected to the energizing instrumentalities for enabling and disabling the same. The switch is normally operative for enabling the energizing instrumentalities and is actuatable to disable the instrumentalities. In addition, an actuating device cooperative with the carriage and the switch is provided for actuating the switch after a predetermined time interval if the carriage is not moved from the home position, or back to the home position, during the aforesaid predetermined time interval.

10 Claims, 5 Drawing Figures

TIMING APPARATUS IN A COPIER

BACKGROUND OF THE INVENTION

In copiers of the type disclosed in U.S. Pat. applications Ser. Nos. 901,119; 901,203;, now U.S. Pat. No. 4,148,578; 901,204; and 901,205; respectively filed on Apr. 28, 1978, in the name of the present inventor and assigned to the assignee of the present invention; there is disclosed a copier which includes a reciprocable document transporting carriage which is moved through a document illuminating station, from its home position, in timed relationship with the passage of copy paper through a cutting station and an illuminating station. The copier includes a switch at the illuminating station which is actuated by the leading edge of the copy paper to commence movement of the carriage and to light a high intensity lamp for illuminating the document being moved through the illuminating station by the carriage. In the course of movement of the carriage, the carriage operates copy paper cutting means at the cutting station. If the trailing edge of the copy paper does not release the switch to permit extinguishing the lamps and returning the carriage to the home position, the cutting knife will not cut a length of copy paper from the copy paper roll; the lamps will remain lit and copy paper will continue to be fed from the copy paper roll until the entire roll of copy paper passes through the illuminating station. If this occurs, the supply of copy paper will become depleted and the seals in the vicinity of the illuminating station may become overheated by the high intensity lamp. Accordingly:

An object of the present invention is to provide, in a copier which includes a document transporting carriage reciprocable from a home position and through a document illuminating station, apparatus for disabling the copier in the event that the carriage does not return to the home position after a predetermined time interval from commencement of movement of the carriage;

Another object is to provide, in a copier including means for energizing the copier, apparatus for deenergizing the copier a predetermined time interval after document copying is commenced if the carriage is not moved from the home position; and Yet another object is to provide a copier including means for deenergizing the copier in the event that the carriage is not returned to the home position in a predetermined time interval.

SUMMARY OF THE INVENTION

In a copier including a document transporting carriage movable from home position through a document illuminating station and back to said home position, and including means for energizing said copier for a predetermined time interval to copy a document on said carriage; there is provided timing apparatus comprising: switching means operatively connected to the energizing means for enabling and disabling the energizing means, wherein the switching means is normally operative for enabling the energizing means and is actuatable for disabling the energizing means, and means cooperative with the carriage and the switching means for actuating the switching means if the carriage is not moved from the home position, or back to said home position, during the predetermined time interval.

BRIEF DESCRIPTION OF THE DRAWINGS

As shown in the drawings, wherein like reference numerals deisgnate like or corresponding parts throughout the several figures.

DESCRIPTION OF THE PREFERRED EMBODIMENT

Figure 1:
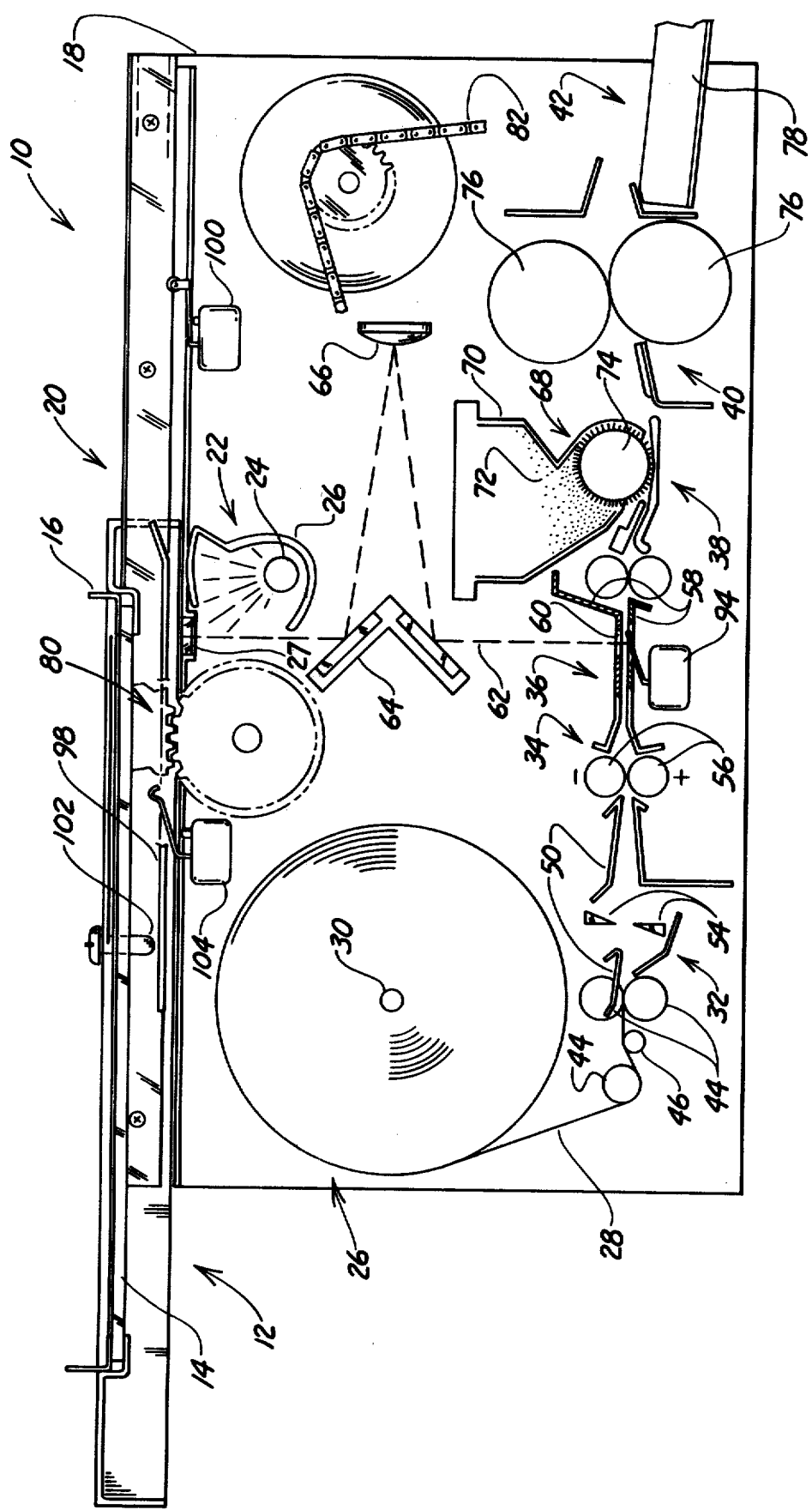
FIG. 1 is a fragmentary schematic view of a copier in which the timing apparatus according to the invention may be incorporated.

As shown in FIG. 1; and in U.S. pat. applications Ser. Nos. 901,119; 901,203; 901,204; and 901,205 respectively filed on Apr. 28, 1978 in the name of the present inventor; a copier 10 of the type in which the present invention may be incorporated comprises a carriage 12 including a glass platen 14 having a cover 16 which may be raised by the operator to dispose a document (not shown) to be copied, face down on the platen 14. The copier 12 includes framework 18 for supporting the components of the copier 10, including conventional slide means 20 to which the carriage 12 is attached for horizontal reciprocable movement from a home position, shown in FIG. 1, through the copier's document illuminating station 22 and back to the home position.

At the illuminating station 22 (FIG. 1) the copier 10 has conventional processing means, including one or more high intensity lamps 24 and a reflector 26, for illuminating the document to be copied through an aperture 27.

The copier 10 (FIG. 1) also includes a supply roll 26 of copy paper 28, of the type which comprises a conductive substrate having a photoreceptive coating such as zinc oxide thereon, and suitable means such as a rotatable shaft 30 on which the copy paper roll 26 is mounted. When the copier 10 is energized for document copying purposes, copy paper 28 is unwound from the supply roll 26 and fed through the copier's processing stations, including a copy paper cutting station 32, charging station 34, imaging station 36, developing station 38 and fixing station 40, and to a copy receiving station 42.

To feed the copy paper 28 (FIG. 1) to the cutting station 32, the copier 10 includes conventional processing means such as a decurling roller 44, tensioning roller 46 and a suitable arrangement of guide plates 50. And, at the cutting station 32 conventional processing means are provided for cutting the copy paper 28, in lengths corresponding to the document length chosen by the operator, including one or more knives 54.

At the charging station 34 (FIG. 1) the copier 10 includes conventional processing means for applying a uniform electrostatic charge to the copy paper 28, including charging rollers 56 which act as feed rollers for pulling the copy paper 28 through the cutting station 32 before the knives 54 cut the copy paper 28. In addition, the charging rollers 56 assist in feeding the cut copy paper 28 through the imaging station 36.

At the imaging station 36 (FIG. 1) conventional processing means are provided for guiding the copy paper 28 through the imaging station 36, such as guide plates 58. In addition, an aperture 60 is formed in one of the guide plates 58 to permit light 62 reflected from the document to impinge on the charged copy paper 28, thereby to dissipate sufficient charge from the charged copy paper to form thereon a charge pattern corresponding to the image on the document being copied. In this connection the copier 10 (FIG. 1) includes conventional processing means between the illuminating and imaging stations 22, and 26, including an optical reflector 64 and an optical lens 66, for transferring reflected light 62 from the document to the copy paper 28.

At the developing station 38 (FIG. 1) conventional processing means are provided such as a magnetic brush-assembly 68, including a hopper 70 containing a supply of toner 72 and a magnetic brush 74, for applying appropriately charged particles of toner 72 to the charge pattern on the copy paper 28, to render the charge pattern visible.

At the fixing station 40 (FIG. 1) the copier 10 has conventional processing means for bonding the toned image pattern in place on the copy paper 28 including cold pressure rollers 76 which act as feed rollers for feeding the finishing copy of the document to the receiving station 42. And, at the receiving station 42 conventional means, such as a receiving tray 78, are provided for collecting the finished copies.

Figure 2:
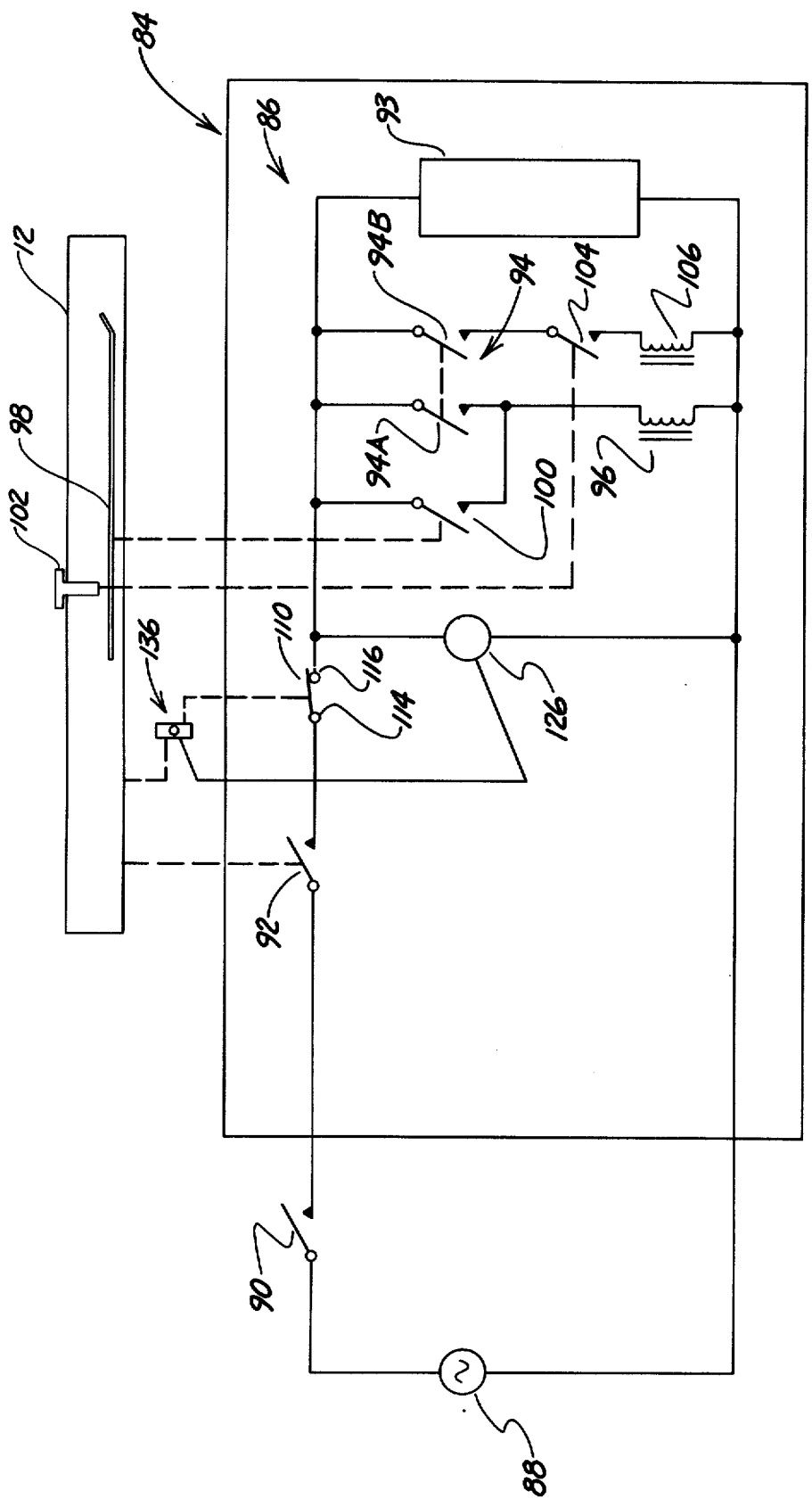
FIG. 2 is a schematic view of the control system and carriage of a copier, showing the timing apparatus according to the present invention coupled to the carriage of the copier.

In addition, the copier 10 (FIG. 1) includes conventional processing means for reciprocating the carriage 12 in timed relationship with feeding and processing the copy paper 28 at the various processing stations, 32, 34, 36, 38, and 40, including intermeshing carriage driving gears 80; and a source of supply of mechanical power for the feeding and processing means including a sprocket chain 82. Further, the copier 10 (FIG. 2) includes conventional control means 84 for timely energizing the feeding and processing means of copier 10 for document copying purposes, including a control circuit 86 adapted to be connected across a source of supply of power 88, via a power switch 90. The control circuit 86 includes a print switch 92, connected in series with the power switch 90. The print switch 92 is manually operable for energizing the copier 10, including conventional circuitry 93, to copy a document on the carriage 12, and is coupled by conventional means to the carriage 12 for operation by the carriage 12 for deenergizing the copier 10 when the carriage 12 returns to the home position. In addition, the control circuit 86 comprises a scan switch 94 including ganged contacts 94A and 94B. The scan contact 94A is series connected in combination with a clutch solenoid 96; which combination is connected in shunt with the print switch 92. The scan switch 94 (FIG. 1) is located at the document imaging station 36, where the leading edge of the copy paper trips the switch 94 to energize the solenoid 96. The clutch solenoid 96 is connected by conventional means via the control system 84 to the carriage 12 (FIG. 2), for moving the carriage 12 from the home position and through the document illuminating station 22 in synchronism with movement of the copy paper 28 through the imaging station 36. As the carriage 12 moves through the illuminating station, and before the copy paper 28 is cut, a cam 98 (FIG. 1) on the carriage 12 operates an override switch 100 connected in parallel with the scan switch contact 94A to maintain the clutch solenoid 96 actuated. The copier 10 also includes a manually slidably movable cam 102 on the carriage 12, a knife switch 104 connected in series with contact 94B of the scan switch 94, and a knife solenoid 106 connected in series with both the switch 104 and contact 94B; the series combination of scan switch contact 94B, switch 104 and solenoid 106 being connected in parallel with the print switch 92. When the carriage 12 moves from the home position, the cam 102 momentarily closes knife switch 104, and, if contact 94B is closed, the knife solenoid 106 is energized to actuate the knives 54 and cut the copy paper 28 to the length chosen by the operator when the operator moves the cam 102 lengthwise on the carriage 12. When the trailing edge of the copy paper 28 releases the scan switch 94, contact 94B is opened, thereby disabling energization of the knife solenoid 106 until the next copying cycle although the cam 102 momentarily closes the knife switch 104 when the carriage 12 returns to the home position. On the other hand, although contact 94A is also opened, the solenoid 96 is not deenergized until the cam 98 releases the override switch 100. When the clutch solenoid 96 is deenergized, carriage 12 is returned by conventional means to the home position to release the print switch 92, thereby deenergizing the copier 10.

For a more detailed description of the copier 10, reference is made to each of the aforesaid U.S. patent applications, the subject matter of which is hereby incorporated by reference.

Figure 3:
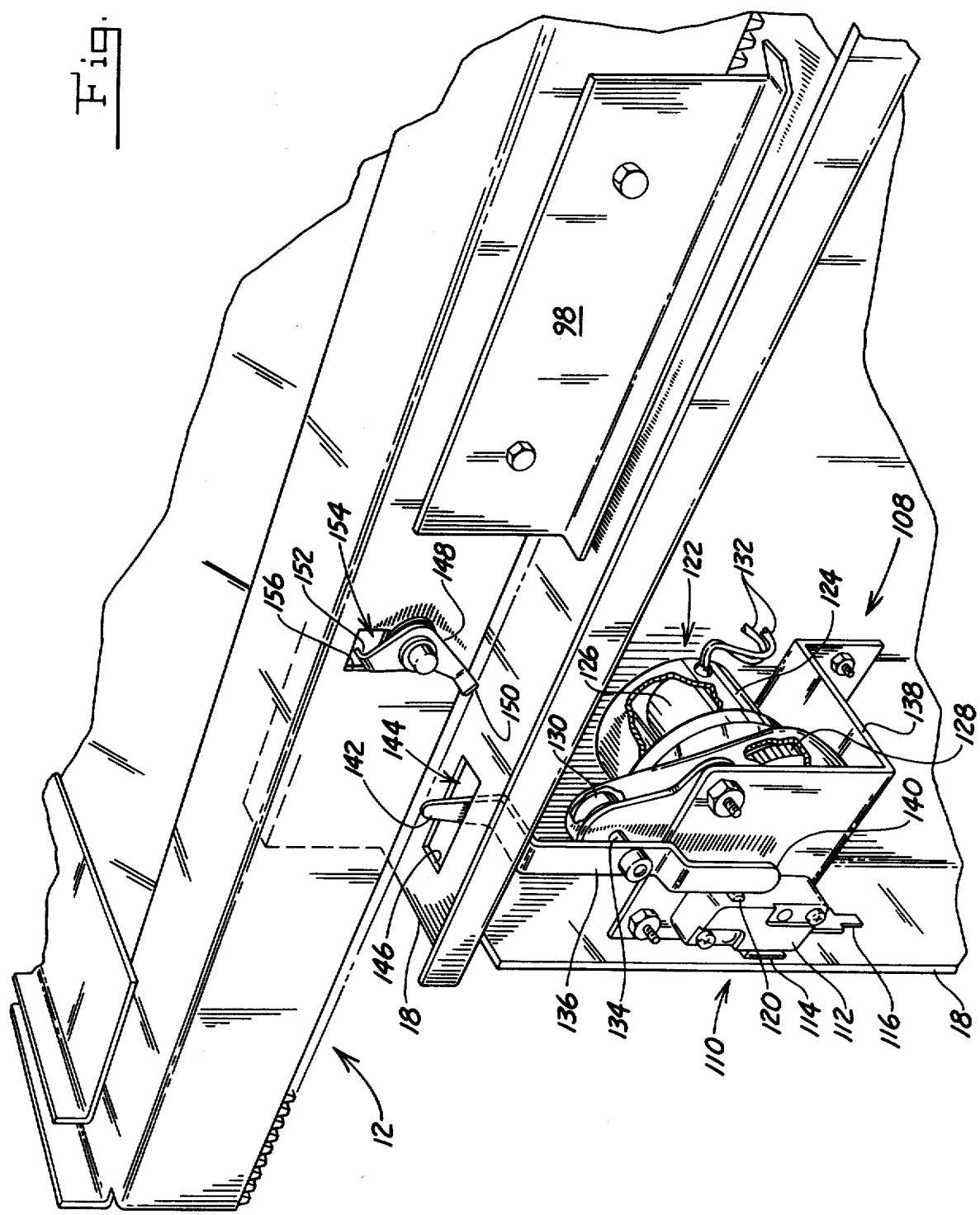
FIG. 3 is a fragmentary perspective view of a copier, showing the timing apparatus setting when the carriage is not timely returned to the home position.

According to the invention, timing apparatus 108 (FIG. 3) is provided for deenergizing the copier 10, and in particular the control system 84 of the copier 10, if the carriage 12 does not leave the home position, or does not return to the home position, at the end of a predetermined time interval after the control system 84, and thus the copier 10, is energized for the purpose of making a copy of a document on the carriage 12.

The timing apparatus 108 comprises a two-position switch 110 including a housing 112; and has a common terminal 114, and a normally closed terminal 116 extending from the housing 112. The switch 110 also includes a conventional actuator 120 extending from the housing 112 for operating the switch 110. The switch actuator 120 has a released position, wherein the common terminal 114 and normally closed terminal 116 are electrically connected to each other, and has a depressed position, wherein the common terminal 114 and normally closed terminal 116 are electrically disconnected from each other.

The timing apparatus 108 (FIG. 3) also includes means for actuating the switch 110 comprising a timer 122 including a housing 124, and including timing motor 126, reduction gear train 128 and two-way friction clutch 130 mounted within the housing 124. The timer 122 is suitably adapted to be connected via leads 132 to a source of supply of power for energizing the timing motor 126, and thus the timer 122, and includes an output shaft 134.

In addition, the timing apparatus 108 (FIG. 3) includes an elongated timer arm 135 which is fixedly attached to the timer output shaft 134 for rotation therewith. The timer 122 and switch 110 are respectively fixedly attached to a bracket 138, which is connected to the framework 18 of the copier 10 so as to locate the lower end 140 of the arm 136 for movement into and out of engagement with the switch actuator 120. And to locate the upper end 142 of the arm 136 in an aperture 144 formed in the copier framework 18 for movement into and out of engagement with a stop 146 defined by a portion of the wall of the aperture 144.

Further, the timing apparatus 108 (FIG. 3) includes a one-way pawl 148 pivotably attached by well known means to the carriage 12 for movement therewith. The lower end of the pawl 148 includes a finger 150 extending therefrom, for movement by the carriage 12 into and out of engagement with the upper arm end 142. And, the upper end of the pawl 148 includes a finger 152 extending into an aperture 154 formed in the carriage 12, for movement by the arm's upper end 142 into and out of engagement with a stop 156 defined by a portion of the wall of the aperture 154.

According to the invention, the timing switch 110 (FIG. 3) is electrically connected in the control circuit 86 (FIG. 2) in series with the print switch 92. Since the common terminal 114 and normally closed terminal 116 are utilized for circuit connection purposes, the switch 110 is normally closed and operative for enabling energization of the control circuit 86 and thus the copier 10 through manual actuation of the print switch 92.

When the switch 110 is actuated, by depressing the switch actuator 120 (FIG. 3) toward the switch housing 112, the common terminal 114 and normally closed terminal 116 are electrically disconnected; as a consequence of which the switch 110 is opened and operative for disabling energization of the control circuit 86 and thus the copier 10. In addition, the timing motor 126, and thus the timer 122, is electrically connected in the control circuit 86 for energization via the print switch 92 and timing switch 110. With this arrangement, the timing motor 126, and thus the timer 122, is energized to commence rotation of the arm 136 when the print switch 92 is manually actuated. And, if the arm 136 is rotated sufficiently to depress the switch actuator 120 (FIG. 3), the switch 110 (FIG. 2) is actuated to disable the control circuit 86 and thereby the timer motor 126.

Figure 4:
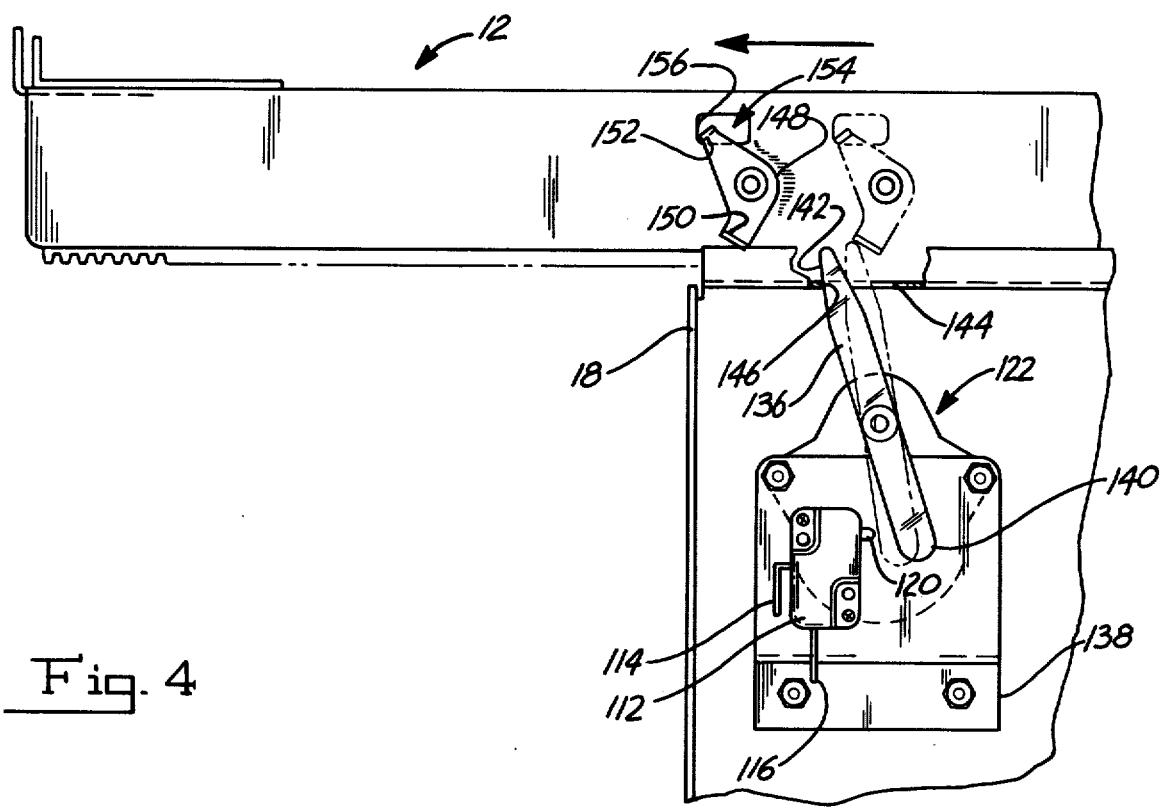
FIG. 4 is a fragmentary side view of FIG. 3 showing the timing apparatus being reset by the carriage of the copier as the carriage moves to its home position.

As shown in FIG. 4, when the carriage 12 is located in the home position, the timer arm's upper end 142 is disposed in contact with the stop 146 and the timer arm's lower end 140 is spaced apart from the switch actuator 120. In addition, the pawl 148 is located to the left of the timer arm's upper end 142. When the print switch 92 is actuated by the operator, the control system 84, and thus the copier 10, is energized for document copying purposes. As a result, the timer motor 126 is energized through the normally closed switch 110; causing the timer motor 126 (FIG. 3) to commence rotating the timer arm's upper end 142 away from the stop 146, and its lower end 140 toward the switch actuator 120.

Figure 5:
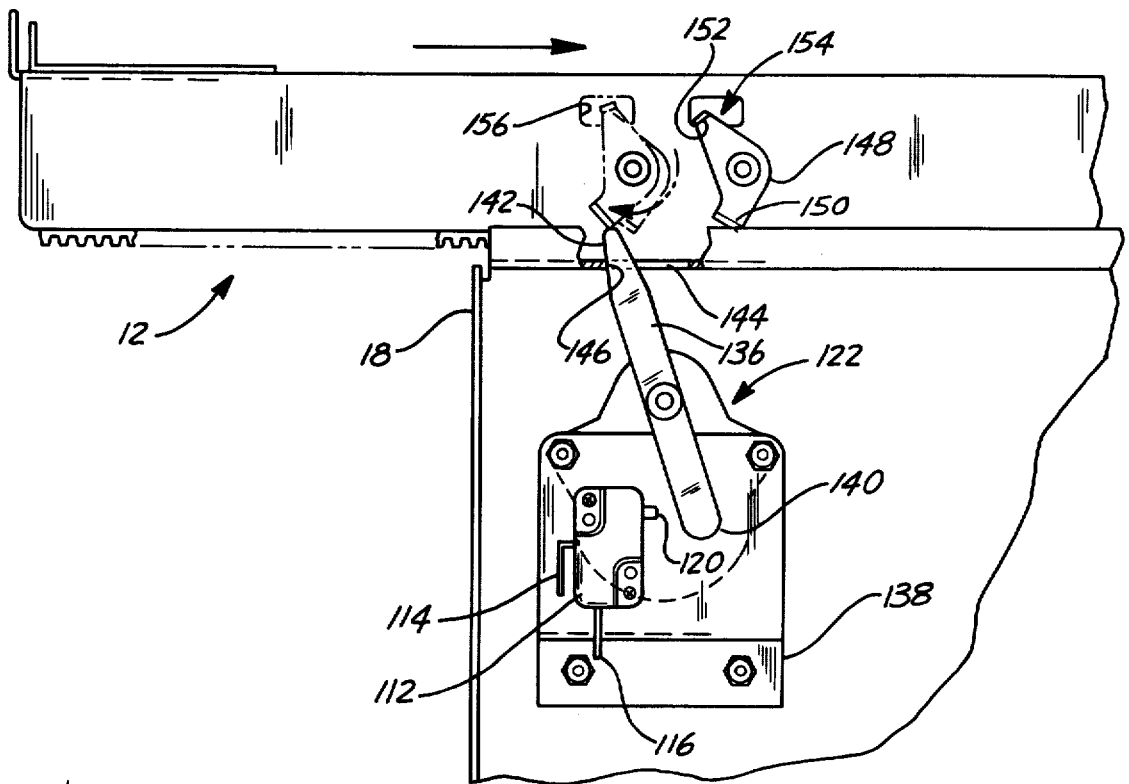
FIG. 5 is a view of FIG. 4 showing the timing apparatus setting when the carriage commences movement from the home position.

As hereinbefore discussed, the carriage 12 does not commence movement from the home position until such time as the leading edge of the copy paper 28 actuates the scan switch 94. And, when the scan switch 94 is actuated, the clutch solenoid 96 is energized through contact 94A to commence moving the carriage 12 from the home position and through the illuminating station 22, and the knife switch 104 is enabled through contact 94B to energize the solenoid 106 when the switch 104 is closed. When the carriage 12 moves from the home position, the carriage 12 carries the pawl's lower finger 150 (FIG. 5) into contact with the timer arm's upper end 142. Continued movement of the carriage 12 causes the arm 136 to pivot the pawl 148 so that the finger 150 clears the timer arm's upper end 142 without interferring with rotation of the timer arm 136. Accordingly, the timer arm's lower end 140 is not urged into contact with the switch actuator 120 by the pawl 148, when the carriage 12 moves from the home position. Under normal operating conditions, as the carriage 12 moves through the illuminating station 22 the copy paper 28 is synchronously fed through the imaging station 36 (FIG. 1); and, in sequential order, as hereinbefore described, cam 98 (FIG. 2) closes the override switch 100, cam 102 momentarily closes the knife switch 104 to energize the knife solenoid 106 for cutting the copy paper 28, the trailing edge of the copy paper 28 releases the scan switch 94, thereby opening contacts 94A and 94B to prevent energization of the knife solenoid 106 when the carriage 12 returns to the home position. Thereafter, the cam 98 releases the override switch 100, thereby deenergizing the solenoid 96 to permit the carriage 12 to be returned to the home position. As the carriage 12 (FIG. 4) returns to the home position the pawl's lower finger 150 is carried into engagement with the timer arm's upper end 142; resulting in the arm 136 pivoting the pawl's upper finger 152 into contact with the stop 156. Whereupon continued movement of the carriage 12 causes the pawl's lower finger 150 to urge the timer arm's end 142 toward the stop 146, against the friction imposed on the timer output shaft 134 (FIG. 3) by the two-way friction clutch 130; thereby rotating the timer arm's lower end 140 (FIG. 4) away from the switch actuator 120 to prevent actuation of the switch 110 and to reset the timer 122. The pawl 148 then clears the timer arm's upper end 142 as the carriage 12 moves back to the home position; whereupon the carriage 12 (FIG. 2), opens the print switch 92 to deenergize the control system 84, and thus the timing motor 126.

If for any reason the carriage 12 (FIG. 4) does not move from the home position, or does not return to the home position, prior in time to the timer 122 rotating the timer arm's lower end 140 into engagement with the switch actuator 120 and depressing the same, the switch 110 will be actuated, thereby opening the switch 110 (FIG. 2) to disable the control circuit 86, and thus the control system 84 and copier 10.

A typical copier 10 (FIG. 1) ordinarily starts and completes a given copy cycle in a maximum predetermined time interval which is a function of the design of the copier 10. For example, in the copier 10 hereinbefore described, the (FIG. 2) to operate the clutch solenoid 96 in a fixed time interval after the operator closes the print switch 92; and the carriage 12 then, in a fixed time interval, moves from the home position, due to the solenoid 96 being energized, and moves back to the home position, due to the solenoid 96 being deenergized. Accordingly, the copier has a predetermined maximum time interval, commencing when the operator closes the print switch 92 and ending with the carriage 12 opening the print switch 92, during which the copier 12 is energized for the purpose of copying a given document; and if the carriage 12 does not move from the home position, or does not return to the home position, at the end of the aforesaid predetermined time interval, an abnormal operating condition has prevented the carriage 12 from doing so.

According to the invention the timer 122 (FIG. 3), and particularly the reduction gear train 128 thereof, is constructed and arranged to rotate the timer arm 136 into actuating engagement with the switch 110 at the end of a time interval which is longer that the aforesaid predetermined time interval during which a given document is copied. If during a given document copying cycle, the operator prevents the carriage 12 (FIG. 3) from returning to the home position for a relatively short time interval during the copying cycle, the timer arm's lower end 140 will actuate the switch 110 (FIG. 2) to deenergize the copier 10. In addition, if the knife 54 (FIG. 1) fails to cut the copy paper 28, resulting in the scan switch 94 remaining closed and maintaining energization of the clutch solenoid 96 even though the switch 100 is released by the cam 98, the timer 122 will deenergize the copier 10. Further, the timer 122 will deenergize the copier 10 if the scan switch 94 is inoperative, since the timing motor 126 (FIG. 2) is energized upon closure of the print switch 92 and continues to rotate the arm 136 although the carriage does not move from the home position due to the scan switch 94 not being closed to energize the solenoid 96. And, other examples of the fail-safe characteristics of the timing apparatus of the present invention will occur to those skilled in the art as a result of reading the foregoing.

In accordance with the objects of the invention there has been described timing apparatus in a copier which includes means for energizing the copier, the timing apparatus including means for deenergizing the copier a predetermined time interval after document copying is commenced if an abnormal condition interferes with timely movement of the carriage.

Inasmuch as certain changes may be made in the above described invention without departing from the spirit and scope and the same, it is intended that all matter contained in the above description or shown in the accompanying drawings shall be interpreted in an illustrative rather than limiting sense. And, it is intended that the following claims be interpreted to cover all the generic and specific features of the invention herein described.

What is claimed is:

1. In a copier including a document transporting carriage movable from a home position through a document illuminating station and back to said home position, and including means for energizing said copier for a predetermined time interval to copy a document on said carriage, timing apparatus for disabling said energizing means comprising:
   a. switching means operatively connected to said energizing means for enabling and disabling said energizing means, said switching means being normally operative for enabling said energizing means and being actuatable to disable said energizing means; and
   b. means coopertive with said carriage and said switching means for actuating said switching means if said carriage is not moved back to said home position during said predetermined time interval.

2. The apparatus according to claim 1, wherein said interval is a first predetermined time interval, said actuating means including a timing motor and an arm connected to said motor for rotation thereby, said arm having a rest position wherein said arm is disposed out of engagement with said switching means, and said arm being rotatable out of said rest position and into engagement with said switching means by said timing motor for actuating said switching means at the end of a second predetermined time interval ending after said first predetermined interval.

3. The apparatus according to claim 1, wherein said energizing means includes a print switch, and said switching means including a normally closed switch electrically connected in series with said print switch.

4. The apparatus according to claim 2, wherein said carriage includes a stop extending therefrom and movable thereby into engagement with said arm for normally returning said arm to said rest position during said first predetermined time interval, thereby to prevent said arm from actuating said switching means during said second predetermined time interval.

5. The apparatus according to claim 2, wherein said timing motor is energized when said copier is energized, and said second time interval is longer than said first time interval.

6. The apparatus according to claim 4, wherein said timing motor includes clutch through which said arm is rotated by said timing motor, said clutch being adapted to slip when said arm is returned to said rest position.

7. In a copier including means for energizing said copier for copying a document during a copying cycle, timing apparatus for disabling said energizing means, comprising:
   a. switching means operatively connected to said energizing means for enabling and disabling said energizing means, said switching means being normally operative for enabling said energizing means and being actuatable to disable said energizing means; and
   b. means cooperative with said switching means for actuating said switching means in a predetermined time interval after energizing said copier, said actuating means including a timing motor and an arm connected to said motor for rotation thereby, said arm having a rest position wherein said arm is disposed out of engagement with said switching means, and said arm being rotatable out of said rest position and into engagement with said switching means by said timing motor for actuating said switching means at the end of said predetermined time interval.

8. The apparatus according to claim 7, wherein said energizing means includes a print switch, and said switching means including a normally closed switch electrically connected in series with said print switch.

9. The apparatus according to claim 7, wherein said timing motor is energized when said copier is energized, and said time interval is longer than said copying cycle.

10. The apparatus according to claim 7, wherein said timing motor includes a clutch through which said arm is rotated by said timing motor, said clutch being adapted to permit said arm to be returned to said rest position.

* * * * *